No. 659,669. Patented Oct. 16, 1900.
C. F. HAYNES.
SIPHON.
(Application filed Dec. 26, 1899.)
(No Model.)

WITNESSES.
Henry Marsh
Lillian J. Basford

INVENTOR
Charles F. Haynes,
by R. E. Teschemacher
Atty.

UNITED STATES PATENT OFFICE.

CHARLES F. HAYNES, OF BOSTON, MASSACHUSETTS.

SIPHON.

SPECIFICATION forming part of Letters Patent No. 659,669, dated October 16, 1900.

Application filed December 26, 1899. Serial No. 741,671. (No model.)

*To all whom it may concern:*

Be it known that I, CHARLES F. HAYNES, a citizen of the United States, residing at Boston, in the county of Suffolk and State of Massachusetts, have invented an Improvement in Siphons, of which the following is a specification.

My invention has for its object to provide a siphon-tube with a simple, cheap, and effective means for starting the flow of the liquid therethrough without the employment of an air-bulb or other device for exhausting the air therefrom.

To this end my invention consists in a siphon-tube provided at its suction end with an enlarged intake or funnel forming when raised into an upright position a filler for the tube, whereby the flow of the liquid can be established as soon as the funnel is reversed and submerged in the liquid, as hereinafter more fully set forth.

My invention also consists in a novel device for supporting the siphon over the edge of the liquid-containing receptacle, whereby it is securely held in position without an angular bend.

Figure 1:
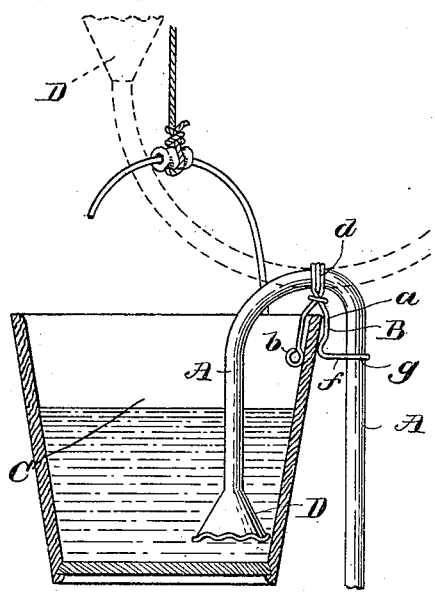
Figure 2:
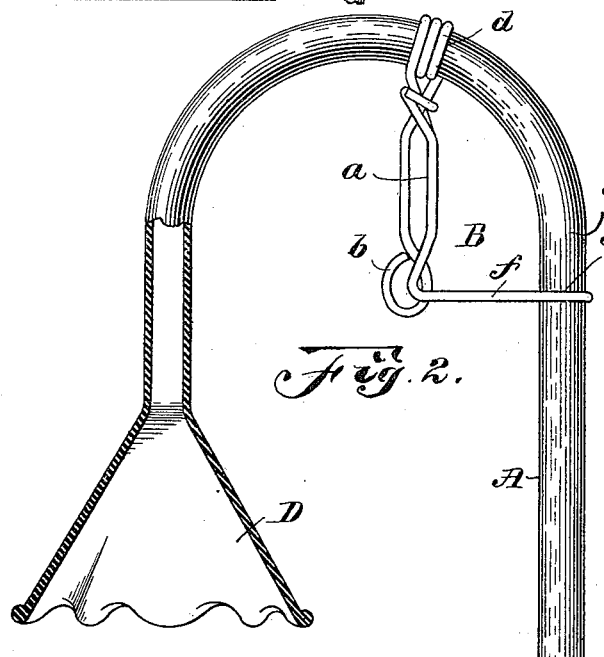
Figure 3:
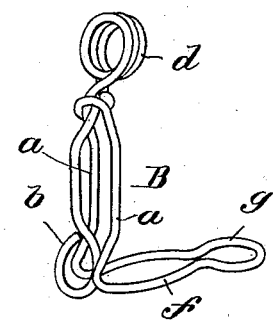

In the accompanying drawings, Figure 1 is a sectional elevation of my siphon-tube suspended over the edge of a liquid-containing receptacle. Fig. 2 is an enlarged sectional elevation of the siphon-tube and the holder by which it is suspended over the edge of the receptacle without an angular bend. Fig. 3 is a perspective view of the siphon-holder detached.

In the said drawings, A represents a flexible siphon-tube, and B a holder for supporting the same without an angular bend over the edge of a vessel or receptacle C, suspended or supported in any suitable manner and from which the liquid is to be drawn by means of said siphon. The suction end of the tube A is provided with an enlarged intake or funnel D, which when the siphon is in use lies near or rests on the bottom of the liquid-containing vessel. The edge of the funnel is preferably scalloped or provided with holes or notches to prevent the stoppage of the flow of the liquid in case the edge of the funnel should rest squarely on the bottom of the vessel. When the flow of the liquid is to be started, it is simply necessary to invert the funnel D at the suction end of the tube while it is in the liquid and then raise it with the liquid which it contains above the edge of the vessel C, as shown by dotted lines in Fig. 1, when the liquid will fill the tube, the outer portion of which should be held up sufficiently high, as shown dotted, to retain the liquid therein, after which the suction end of the tube with its funnel is quickly reversed and submerged in the liquid, when the flow will be at once established, as desired. If preferred, the tube may be filled by pouring the liquid into the funnel D, previously upturned for the purpose, and then quickly reversing it and submerging it in the liquid.

The holder B, by which the siphon-tube is supported over the edge of the liquid-containing receptacle C, consists of a single piece of wire bent to form a doubled portion or jaw $a$ and a spring tongue or jaw $b$, the bottom of which fits between the two parts of the portion $a$ and projects below the same to enable it to engage the edge of the vessel C, whereby it may be forced outward by a downward pressure on the holder to separate it from the jaw $a$, so that the said jaws may pass down over the edge of the vessel to clasp the opposite side of the same, as shown in Fig. 1. At the top of the holder the wire is coiled to form an eye $d$, and at the bottom of the holder is a horizontal portion $f$, forming a lateral extension of the jaw $a$ and having formed at its outer end an eye $g$, through which and the upper eye $d$ the siphon-tube passes and by which it is clasped with sufficient friction to avoid slip, said eyes being arranged, as shown, to hold the tube A without any angular bend, which would interfere with the free flow of the liquid therethrough. The horizontal portion $f$ forms a convenient handle, by means of which the holder can be hooked over the edge of the liquid-containing vessel or removed therefrom.

I do not confine myself to a holder constructed as above described, as any other suitable device which will support the siphon-tube over the edge of the liquid-receptacle without an angular bend may be employed, if preferred.

The above-described siphon-tube may, if desired, be provided with a suitable nozzle and used as a syringe, or it may be employed for any other purpose for which a siphon is adapted, its advantage being that it is merely necessary to take hold of the enlarged intake when immersed in the liquid and lift it into an upright position above the curved portion of the siphon-tube, which rests over the edge of the receptacle, the quantity of liquid contained in the intake when raised being sufficient to fill the tube and start the flow of the liquid therethrough, which is thus accomplished in a much simpler and more convenient manner than heretofore.

What I claim as my invention, and desire to secure by Letters Patent, is—

1. In a siphon, the combination of a flexible tube, a holder for supporting the same over the edge of the liquid-containing receptacle without an angular bend, and an enlarged intake or funnel secured to the suction end of the tube for facilitating the filling of the same to start the flow of the liquid therethrough, substantially as described.

2. The combination with a flexible siphon, of a holder consisting of a single piece of wire doubled to form spring-jaws adapted to be hooked over the edge of the liquid-receptacle, and having a lateral extension $f$ and eyes $d$, $g$, for holding the flexible tube in a curved position over the edge of the receptacle, substantially as described.

Witness my hand this 20th day of December, A. D. 1899.

CHARLES F. HAYNES.

In presence of—
P. E. TESCHEMACHER,
LILLIAN I. BASFORD.